No. 832,069. PATENTED OCT. 2, 1906.
A. V. LINDQUIST.
REEL.
APPLICATION FILED FEB. 27, 1906.

Witnesses
M. C. Lyddane
S. W. Fitzgerald

Inventor
A. V. Lindquist
By W. J. Fitzgerald & Co.
Attorneys

UNITED STATES PATENT OFFICE.

ALBERT V. LINDQUIST, OF ALEXANDRIA, MINNESOTA.

REEL.

No. 832,069.  Specification of Letters Patent.  Patented Oct. 2, 1906.

Application filed February 27, 1906. Serial No. 303,243.

*To all whom it may concern:*

Be it known that I, ALBERT V. LINDQUIST, a citizen of the United States, residing at Alexandria, in the county of Douglas and State of Minnesota, have invented certain new and useful Improvements in Reels; and I do hereby declare the following to be a full, clear, and exact description of the invention, such as will enable others skilled in the art to which it appertains to make and use the same.

My invention relates to reels, and more particularly to that class adapted to store the fishing-line in a housing without winding the same around a spool or drum.

The main object of my invention is to provide a device whereby the speed of the outgoing line may be controlled or allowed to move freely from out of the housing, thereby obviating backlashing encountered in reels having winding drums or spools.

A further object is to provide means for taking in and storing the line after the same has been run out.

A still further object is to provide a suitable housing for the line when the same has been reeled in or not in use.

Further objects and advantages will be hereinafter made clearly apparent, and pointed out in the claims.

In the accompanying drawings I have shown the preferred form of my invention.

Figure 1:
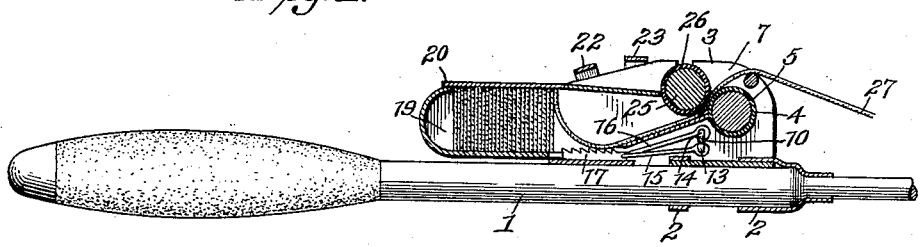
Figure 2:
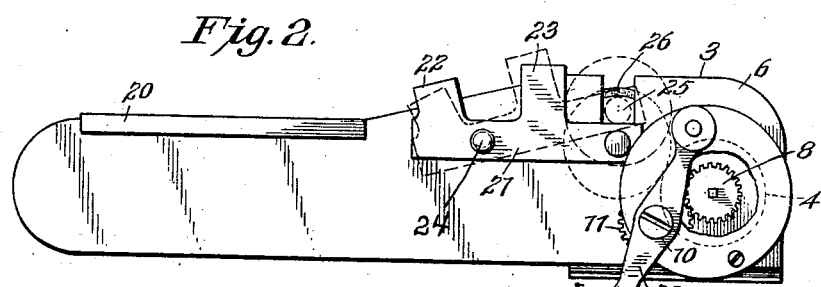
Figure 3:
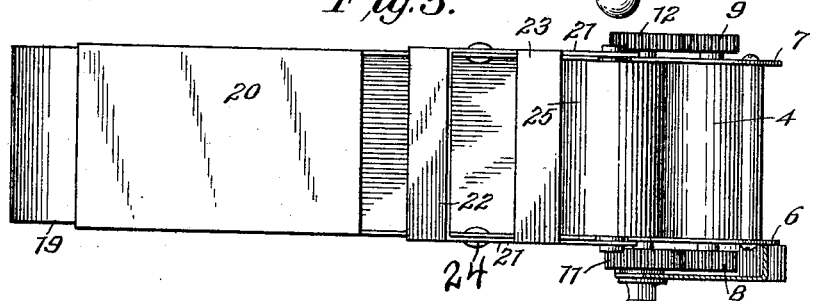
Figure 5:
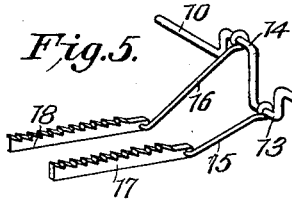
Figure 4:
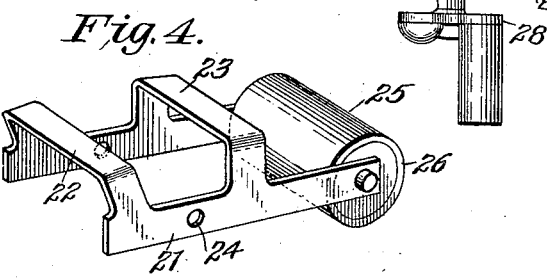

In said drawings, Figure 1 is a longitudinal sectional view of my improved reel as applied to use on a fishing-rod. Fig. 2 is a side elevation of my improved reel on a larger scale from that shown in Fig. 1. Fig. 3 is a top plan view thereof. Fig. 4 is a detail perspective view of the controlling means for said reel, and Fig. 5 is a detail perspective view of the line feeding or storing mechanism removed from the housing.

Referring to the figures by numerals of reference, 1 designates a section of a fishing-pole which may be of any preferred form, and 2 indicates the securing means for reels usually carried by said poles. Mounted on the upper side of the rod 1 in any preferred way is my improved winding-reel 3, said reel comprising a roller 4, rotatably mounted in the front end of the reel proper, said roller having a covering of rubber or other like yielding substance 5. The bearing-spindles of said roller extend through the walls 6 and 7 and carry pinions 8 and 9 on the projecting ends thereof. Extending through the reel 3 on a line with the roller 4 is a crank-shaft 10, having pinions 11 and 12 at its opposite ends, said pinions meshing, respectively, with the pinions 8 and 9, carried by the roller 4. Secured to the crank portions 13 and 14 of the shaft 10 are pitmen 15 and 16, to the outer or free ends of which are secured feed-arms 17 and 18. The inner end of the reel 3 is so constructed as to form a compartment 19, said compartment being provided on its upper surface with a sliding lid or cover 20, whereby ready access may be had to the interior of said compartment. Pivotally secured to the walls 6 and 7 is a frame member 21, having connecting-bars 22 and 23, said bars being disposed upon opposite sides of the pivot-pin 24 of said frame. Carried between the forward ends of said frame 21 is an auxiliary roller 25, said roller being disposed in juxtaposition to the roller 4 and also provided with a covering of rubber 26. This roller 25 is so arranged that it can be brought into or out of engagement with the roller 4 at the pleasure of the operator.

In operation the line 27 is strung on the pole in the usual manner and a suitable hook is secured to the outer free end thereof, and after the fish has taken said hook and started to run the roller 25 is brought into engagement with the roller 4 by the operator pressing upon the cross-bar 23, thereby bringing pressure to bear upon the line passing out between said rollers and causing the hook to be embedded in the mouth of the fish. After the hook is so embedded if the operator desires to play the fish before attempting to draw it from the water he presses upon the cross-bar 22, which elevates the roller 25 and brings it out of engagement with the roller 4, thereby allowing the line 27 to play out freely. When it is desired to take in the line, the operator can press his thumb upon the cross-bar 23, thereby reëngaging the line between the rolls 25 and 4, and by turning the crank 28 in the direction indicated by the arrow in Fig. 2 the roll 4 is caused to rotate and the line to be drawn inwardly and stored in the housing 19. As the line 27 is drawn inwardly the surface of the feed-arms 17 and 18 frictionally engage the line and feed the same toward the rear end of the housing 19, thereby continuously moving the line toward the rear of the housing out of the road of the incoming portion thereof. The rollers 4 and 25 not only serve to return the line into the housing 19, but also serve to wring the moisture from the line when the same is being rewound into the housing. It will therefore be seen that when the operator is through fishing he can run the line one or more times between the rollers to remove all moisture therefrom, thereby preserving the life of the line. It will further be seen that when the angler makes a cast the line is paid out from the housing without causing any mechanism to be put in motion, thereby overcoming the objectionable feature in the usual form of reels of backlashing, also giving greater ease of casting and with more precision.

What I claim is—

1. In a reel of the class described comprising side walls, a housing formed between said side walls and at one end thereof, a roller rotatably mounted in the opposite ends of said side walls, and means coöperating therewith for depositing the fishing-line within said housing.

2. A reel comprising side walls, a housing at one end of said side walls, a roller rotatably mounted between said walls, an auxiliary roller, and means carried by said side walls to alternately bring said auxiliary roller into or out of engagement with the other roller, and a line passing between and adapted to be controlled by said rollers.

3. A fishing-reel comprising side walls, a housing at one end of said walls, controlling-rollers at the opposite end of said side walls, a line passing between and controlled by said rollers, means to operate said rollers, and additional means to store the line in said housing as the same is reeled inward.

4. A reel of the class described having a housing at one end and line-controlling rollers at the opposite end, means to rotate said rollers, a shaft extending laterally through said reel, and means attached thereto adapted to store the line in said housing as the same is drawn inward.

5. The combination with a reel having suitable side walls; of a pair of rollers mounted in one end thereof, a line passing between said rollers, and means to rotate said rollers whereby the line can be drawn inwardly.

6. In a reel, the combination with side walls; of a roller mounted therein, an auxiliary roller yieldingly held in juxtaposition to said main roller, coverings for said rollers and means pivotally secured to said side walls to control the auxiliary roller, and additional means for rotating said main roller.

7. A reel of the class described comprising side walls, a housing between said side walls, and means to propel a line into said housing.

8. In a reel of the class described, comprising side walls, a housing at one end thereof, means at the opposite end to propel a line into said housing, a crank-shaft extending laterally between said side walls, pitmen attached to said cranks, and feed-arms secured to the outer ends of said pitmen adapted to continuously direct the line into said housing.

9. In a reel of the class described comprising side walls, a main roller rotatably mounted in said side walls, means to rotate said main roller, an auxiliary roller, a frame pivotally secured to said side walls, and cross-bars disposed at opposite sides of said pivot-point whereby said auxiliary roller may be controlled.

In testimony whereof I have signed my name to this specification in the presence of two subscribing witnesses.

ALBERT V. LINDQUIST.

Witnesses:
  GEO. L. TREAT,
  E. EUGENE BUELL.